Aug. 9, 1949.   G. P. ADAMS ET AL   2,478,616
APPARATUS FOR CONTINUOUSLY MAKING VULCANIZED ARTICLES
Filed May 22, 1947
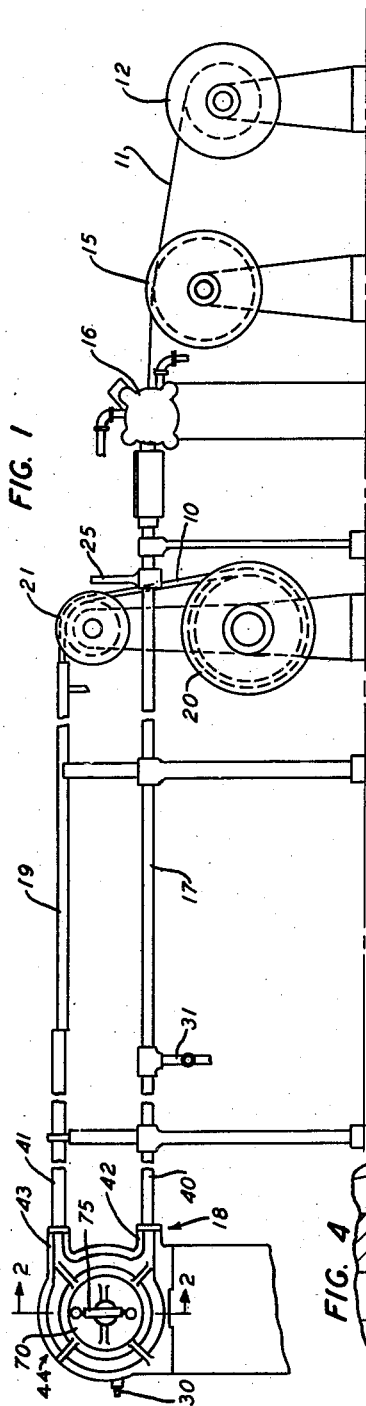
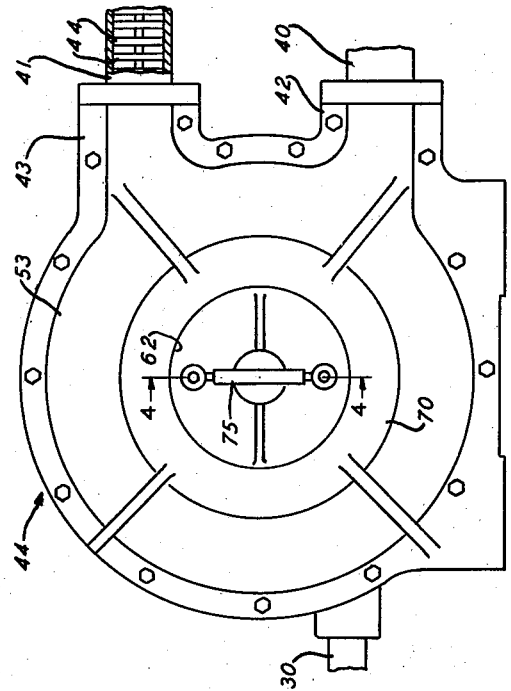
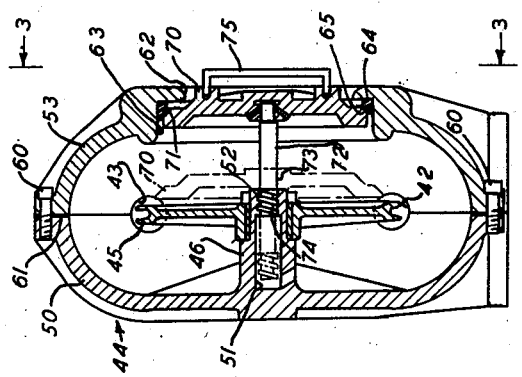
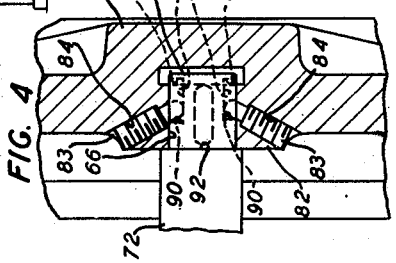
INVENTOR
G. P. ADAMS
G. E. BERGGREN
BY
ATTORNEY Patented Aug. 9, 1949

2,478,616

UNITED STATES PATENT OFFICE 2,478,616

APPARATUS FOR CONTINUOUSLY MAKING VULCANIZED ARTICLES

George P. Adams and George E. Berggren, Baltimore, Md., assignors to Western Electric Company, Incorporated, New York, N. Y., a corporation of New York Application May 22, 1947, Serial No. 749,825

4 Claims. (Cl. 18—6)

This invention relates to apparatus for continuously making vulcanized articles, and more particularly to apparatus for cooling continuous lengths of vulcanized articles emerging from vulcanized tubes having steam under a high pressure therein and for sealing the steam in the vulcanizing tubes from the atmosphere.

In the manufacture of filamentary articles having vulcanizable coverings around cores, which includes elements of hygroscopic materials such as textile materials, such a core is sometimes passed through an extruder, which extrudes a covering of vulcanizable material thereover, and then is passed through a vulcanizing tube to vulcanize the covering. The vulcanizing tube has steam at a high temperature and under a high pressure therein, and the heat of the steam vaporizes moisture in the hygroscopic elements of the core. While the covering is in the vulcanizing tube and is subjected to the high pressures of the steam, this vaporized moisture does not damage the covering. However, if the vaporized moisture is not cooled sufficiently before the article is withdrawn from the vulcanizing tube into the atmosphere, the pressure of the vaporized moisture enclosed in the covering of vulcanized material may rupture or expand the covering.

In the past elongated water seals having cold water under a high pressure therein have been used to cool the covered conductors and have been placed in tandem with the vulcanizing tube. Due to the high pressure of the steam to be sealed and the high wire speed operation of the apparatus, the seal had to be very long in order to effect the necessary cooling under high pressure of the covered conductor and to reduce the pressure of the vaporized moisture enclosed thereby, as a result such seals have required a large amount of floor space. U-shaped cooling tubes have been proposed to lessen the floor space needed for such a seal without decreasing th length of the seal, but U-shaped seals theretofore known have been difficult to thread with the conductors due to the bend therein.

An object of the invention is to provide new and improved apparatus for continuously making vulcanized articles.

Another object of the invention is to provide new and improved apparatus for cooling vulcanized filamentary articles and for effectively sealing steam in vulcanizing tubes with water.

A further object of the invention is to provide a U-shaped seal having a quickly openable closure member in a portion thereof to provide access to the interior of the seal to facilitate stringing filamentary articles through the seal.

An apparatus illustrating certain features of the invention includes a water tight housing having an inlet and an outlet, a sheave mounted rotatably in the housing, said housing having a circular opening in one side thereof and a socket formed in the other side thereof, a plate for closing the opening in the housing, and a shaft for mounting the plate provided with a threaded portion for engaging the threaded portion of the socket, said threaded portion of the shaft being designed to be screwed completely through the threaded portion of the socket to permit the shaft to be slid further into the socket to move the plate away from the opening to provide access to the interior of the housing.

A complete understanding of the invention may be made from the following detailed description of an apparatus forming a specific embodiment thereof, when read in conjunction with the appended drawings, in which:

Fig. 1 is a fragmentary, side elevation of a portion of an apparatus illustrating certain features of the invention;

Fig. 2 is an enlarged vertical section taken along line 2—2 of Fig. 1;

Fig. 3 is an enlarged side elevation of the apparatus taken along line 3—3 of Fig. 2, and Fig. 4 is an enlarged, fragmentary vertical section taken along line 4—4 of Fig. 3.

Referring now in detail to the drawings, there is shown therein a continuous extruding and vulcanizing machine for forming and vulcanizing a protective covering 10 (Fig 1) around a filamentary core 11. In forming the covering around the core, the core is advanced continuously from a supply reel 12 at a high rate of speed by a supply capstan 15 disclosed and claimed in copending application Serial No. 697,809, filed September 8, 1946, by D. D. Jones, for "Apparatus for covering cores," and is advanced continuously from the supply capstan 15 through an extruder 16, an elongated vulcanizing tube 17, a cooling and sealing unit 18, and a cooling trough 19 to a takeup reel 20 by a takeup capstan 21. As the core 11 is drawn from the supply capstan 15 it passes through the extruder 16, which extrudes the covering of the vulcanizable insulation thereover. The covered core then passes into the elongated vulcanizing tube 17, which has steam under a high pressure supplied thereto by a steam pipe 25, whereby the covering is vulcanized while it is advanced through the vulcanizing tube. The covered core passes from the vulcanizing tube into and through the unit 18, wherein the covering 10 is cooled by cold water maintained under a high exterior pressure and supplied to the seal through an inlet pipe 30. A portion of the water is drained from the unit 18 through a drain pipe 31.

The unit 18 includes an entrance pipe 40 and an exit sealing pipe 41 connected to an inlet 42 and an outlet 43, respectively, of a return housing 44, in which the covered core is passed around a return sheave 45. A plurality of baffles 44—44 mounted in the sealing pipe 41 reduces the pressure of the water to a pressure not much above that of the atmosphere at the right end of the pipe 41, as viewed in Fig. 1, and maintain the pressure of the water at a high pressure at the left end of the pipe 41. The return sheave 45 is mounted rotatably upon a boss 46 (Fig. 2) in a position in which the center lines of the inlet 42 and the outlet 43 are tangent to the sheave. The sheave serves to guide the covered core through the return housing 44 from the inlet 40 to the outlet 41.

The boss 46 is provided with a bore 51 and an internal thread 52 projecting from the periphery of the bore along a relatively short portion of the bore. A housing section 50 and a housing section 53 of the housing 44 are secured together in watertight relationship by bolts 60—60 and a gasket 61. The housing section 53 is provided with a circular hand hole 62 in alignment with and opposite to the boss 46, and also is provided with an inwardly facing counterbore 63, in which a sealing ring 64 having a bevelled face 65 fixed. A closure plate 70 having a bevelled periphery 71 complementary to the bevelled face 65 of the gasket 64 is mounted on an arbor 72, which fits slidably in a socket 66 formed in the closure plate. The right end of the socket 66, as viewed in Fig. 4, is enlarged to catch any debris which might get into the socket, thereby preventing the debris from lodging between the base of the socket and the end of the arbor. The arbor 72 has a relatively long unthreaded section 73 and a relatively short thread 74 which projects radially from the periphery of the arbor and is complementary to the thread 52 in the bore 51.

The closure plate 70 may be rotated by a handle 75 fastened thereto to thread the arbor 72 further into the bore 51 in the boss 46 to effect disengagement between the threads 52 and 74. The plate 70, then may be pushed to slide the arbor to the left, as viewed in Fig. 2, farther into the bore 51 to move the plate 70 to a position almost abutting the return sheave 45. This provides clearance in the hole 62 so that an operator of the apparatus may get both hands into the housing to manipulate the covered core in stringing it through the vulcanizing tube 17 and the seal 18. The closure plate 70 has a diameter smaller than that of the return sheave 45 so that the covered core may be placed in correct position on the return sheave 45 without interference from the closure plate 70.

A reduced end portion 80 (Fig. 4) of the arbor 72 fits slidably into the socket 66 formed in a hub 82 of the closure plate 70. The ends of bolt-like keys 83—83 threaded into tapped bores 84—84 formed in the hub 82 project into elongated keyways 85—85 formed in the reduced end portion 80 of the arbor. Hence, the plate 70 may be slid axially with respect to the arbor between a position in which the keys abut end portions 90—90 of the keyways 85—85 and a shoulder 92 formed on the arbor and a position in which the keys abut end portions 91—91 of the keyways. After the arbor 72 has been screwed far enough to move the face 71 (Fig. 2) of the plate 70 against the face 65 of the sealing ring 64 and the seal 18 is filled with water under a high pressure, the pressure of the water on the inner side of the plate forces the plate to the right, as viewed in Fig. 2, sliding it on the arbor 72. This forces the plate very tightly against the sealing ring to prevent leakage therebetween. Thus, the plate may be closed by rotating it until it is moved into relatively light engagement with the sealing ring 64 and the pressure of water subsequently supplied to the unit 18 will cause tight engagement therebetween.

In the operation of the apparatus described hereinabove, to start an extruding and vulcanizing operation, steam to the pipe 25 is turned off, and water to the pipe 30 is turned off. The core 11 is passed around the supply capstan 15 through the extruder 16, the vulcanizing tube 17 and the pipe 40 into the housing 44 while the closure plate 70 is in the position shown in broken lines (Fig. 2). An operator of the apparatus then pulls enough of the core into the housing to extend around the return sheave 45 and through the tube 41 to the cooling trough 19, and strings the core through these elements. The closure plate 70 (Fig. 2) then is slid to the right, as viewed in Fig. 2, until the thread 74 on the shaft 72 engages the thread 52 projecting into the core 51 and the shaft 72 is turned through the plate 70 and the handle 71 to screw the thread 74 into the thread 52. This is continued until the bevelled periphery 71 of the plate 70 is moved into engagement with the face 65 of the sealing ring 64.

The end of the core 11 projecting into the cooling trough 19 then is pulled through the apparatus, placed upon the takeup capstan 21 and is secured on the takeup reel 20, and steam is supplied through the vulcanizing tube 17 through the pipe 25 and water is then supplied to the housing 44 through the pipe 30. The water pressure slides the plate 70 to the right, as viewed in Fig. 2, relative to the arbor 72 to force the plate into watertight engagement with the sealing ring 64 (Fig. 2). The apparatus then may be started to form the covered core.

The opening and closing of the hand hole 62 through the closure plate 70 may be accomplished very rapidly since the unthreaded portion of the bore 51 and the unthreaded portion of the shaft 73 are sufficiently long and the threads 52 and 74 are sufficiently short that the closure plate 70 need be spun only two or three turns to cause disengagement between the threads 52 and 74, and the major portion of the movement of the plate 70 may be completed merely by pushing it. Hence, the opening 62 may be opened or closed very rapidly. The length of the threads 52 and 74 is just sufficient to latch the plate 70 in light engagement with the sealing ring 64 so that there is no excess screwing action in closing the opening 62, and substantially all the necessary sealing thrust is effected by the pressure of the water on the inner side of the plate 70.

What is claimed is:

1. An apparatus for continuously making vulcanized articles, which comprises a cylindrical housing provided with a pair of openings therein, said housing being provided with a circular opening in an end thereof, a closure plate adapted to close said last-mentioned opening in the housing, a guide projecting from an end of the housing opposite to the end thereof in which the opening is formed, slide means connected to the plate for mounting the plate slidably on the guide, and means for moving the plate to a position closing the opening in the housing.

2. A seal for a continuous vulcanizing tube, which comprises a hollow water type housing having an inlet opening and an outlet opening, said housing being provided with a hand-hole therein, a guideway mounted in the housing, a closure plate mounted in the housing for closing the hand-hole in the side of the housing, a slide mounted in the guideway for mounting the closure plate for movement toward and away from the hand-hole, and means for locking the slide in a position in which the closure plate is in a position closing the hand-hole, said plate being slidably mounted on the slide to permit movement of the plate toward the hand-hole independent of the locking means after the slide has been locked.

3. A seal for a continuous extrusion and vulcanization apparatus, which comprises a cylindrical housing having an inlet in the periphery thereof and outlet in the periphery thereof, said housing also having opposed end walls, a hollow boss projecting from one end wall of the cylindrical housing into the housing, a return sheave mounted rotatably upon the hollow boss for guiding a filament from the inlet opening in the housing to the outlet opening thereof, said housing being provided with an opening in the end wall thereof opposite to that from which the hollow boss projects, a gasket mounted in the housing and surrounding the hand-hole, a closure plate mounted in the housing for abutting the gasket to the hand-hole therein, an arbor mounted slidably in the hollow boss for supporting the closure plate and for pressing the plate against the gasket, and means for latching the arbor in a position holding the closure plate against the gasket, said arbor serving to permit the plate to move relative thereto to press against the gasket when water under a high pressure is supplied to interior of the housing.

4. A seal for a continuous extrusion and vulcanization apparatus, which comprises a housing having an inlet and an outlet and having opposed walls, a boss projecting from one of the walls of the housing into the housing to the central portion of the housing and having an elongated socket therein, a return sheave mounted rotatably upon the boss for guiding a filament from the inlet opening in the housing to the outlet opening thereof, said housing being provided with a hand-hole in the wall thereof opposite to that from which the hollow boss projects, a resilient gasket mounted in the housing in a position surrounding the hand-hole, a closure plate mounted in the housing for engaging the gasket to close, an elongated arbor having an end mounted slidably in the socket in the boss for supporting the closure plate, said arbor having a short thread projecting therefrom, said boss having a short internal thread projecting into the socket thereof, means for mounting the plate slidably on the arbor, said arbor having a shoulder to prevent the plate from sliding away from the gasket.

GEORGE P. ADAMS.
GEORGE E. BERGGREN.

REFERENCES CITED

The following references are of record in the file of this patent:

UNITED STATES PATENTS

| Number | Name | Date |
|---|---|---|
| Re. 16,319 | Wilson | Apr. 13, 1926 |
| 1,449,729 | Cain | Mar. 27, 1923 |
| 2,069,087 | Forstrom et al. | Jan. 26, 1937 |